June 16, 1925.
B. B. HOLMES
1,542,773
MOUNTING FOR AUXILIARY SPRINGS
Filed Nov. 23, 1922   2 Sheets-Sheet 2
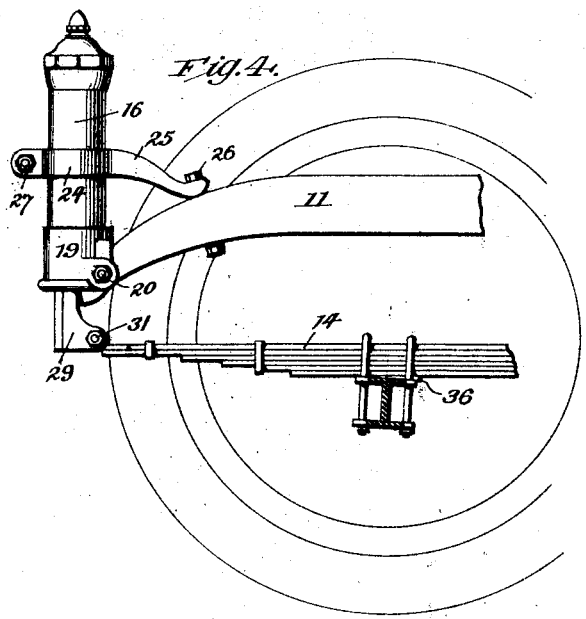
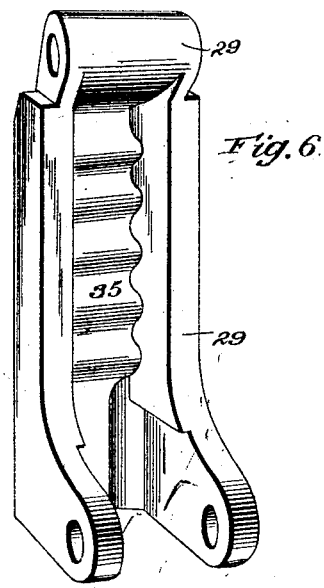
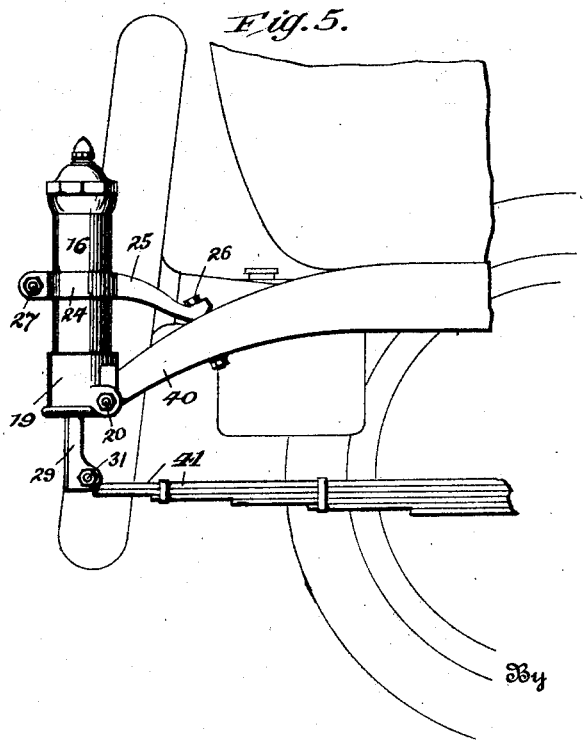
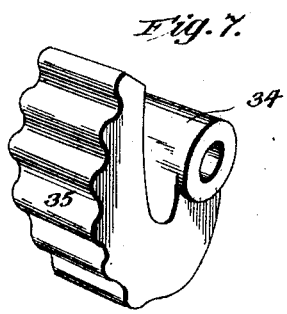
Inventor
Bradford B. Holmes
By Dodge and Sons.
Attorney Patented June 16, 1925.

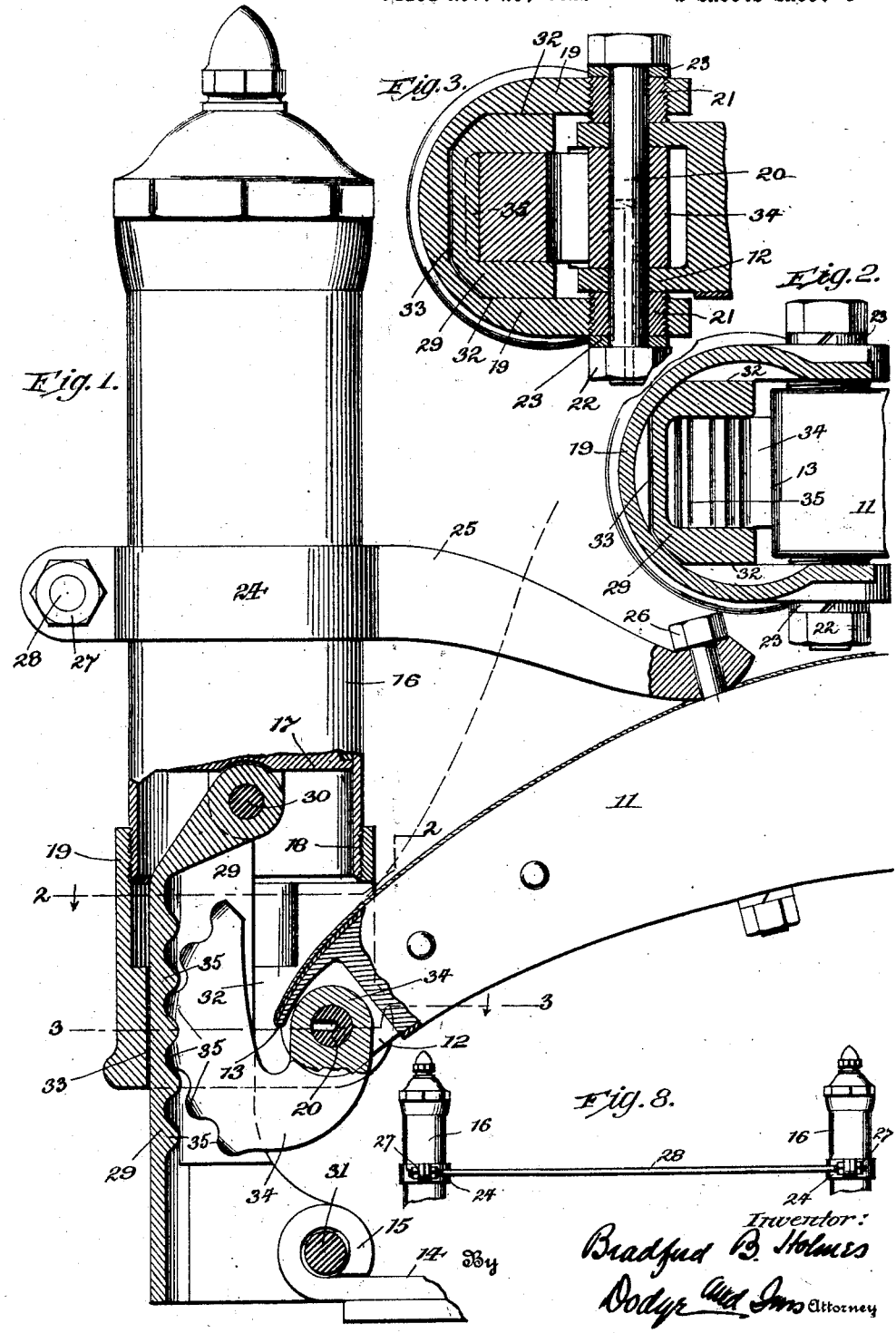

1,542,773

UNITED STATES PATENT OFFICE.

BRADFORD B. HOLMES, OF NEW YORK, N. Y.

MOUNTING FOR AUXILIARY SPRINGS.

Application filed November 23, 1922. Serial No. 602,823.

*To all whom it may concern:*

Be it known that I, BRADFORD B. HOLMES, a citizen of the United States, residing at New York, in the county of New York and State of New York, have invented certain new and useful Improvements in Mountings for Auxiliary Springs, of which the following is a specification.

This invention relates to spring devices and particularly to auxiliary cushions, such as are mounted on the spring horns of automobiles and are connected in load bearing relation with one end of the leaf spring of conventional automobile spring suspensions, for example so-called "semi-elliptic" spring suspensions. When so connected the auxiliary cushion acts to supplement the action of the leaf spring.

Various types of auxiliary cushion may be devised, and many are known, but the present invention is not limited to any particular type except to the extent that it contemplates the use of an approximately vertical guide or cylinder rigidly mounted on the spring horn of the frame, and a slide or piston yieldingly mounted in said guide or cylinder and connected to the end of the leaf spring. Thus, while I show the invention as applied to a pneumatic auxiliary cushion, I imply no necessary limitation thereto.

The present invention resides in the mode of mounting the guide or cylinder on the spring horn, and in the mode of connecting the slide or piston to the spring. The particular object in view is to reduce the number of fittings required by the diverse size and inclination of the spring horns of different makes and models of cars, and by the difference in the degree of convergence of the side bars on which these spring horns are formed.

The invention permits the upright guide to be mounted properly on practically any American built automobile having a semi-elliptic spring suspension, by the use of some one of only four different sizes of base. Furthermore the novel construction of the strut connection and of the base permits these parts to be used with both front springs and rear springs of automobiles despite the fact that for front springs as usually mounted the strut connection should be guided in substantially right-line movement while for rear springs it should be free to act as a swinging link.

This last feature is secured largely as a result of the offset nature of the strut link which causes a turning moment to be applied to the link in such manner as to ensure thrust engagement with a guiding roller under virtually all conditions. Where the link requires to be guided, as in a front spring, the roller is used. Where, as in a rear spring, such guiding is not desired the roller is omitted, thus dispensing with the guiding function and permitting the link to swing.

The fundamental difference between front and rear springs, above referred to, arises from the fact that such springs are invariably pivoted to the chassis at their front ends and are connected to the chassis at their rear ends by swinging links or shackles. The rear auxiliary cushion is applied at the rear of the rear spring and hence the thrust connection to the plunger may be a simple pivoted link. The front auxiliary cushion is applied to the front end of the front spring, and since it is inconvenient and often practically impossible to substitute a pivot connection for the usual link at the rear end of front springs the front end of the spring must be guided in a right line. Slide guides have been used but have proven unsatisfactory and I overcome the difficulty by giving the link a rearward-swinging tendency and then sustaining it against such tendency by using a thrust roller.

The base casting thus exerts only a lateral guiding action on the link in the absence of the roller, though it is so formed as to prevent substantial separation of the link and roller when a roller is used.

The preferred embodiment of the invention is illustrated in the accompanying drawings, in which Fig. 1 is a view, partly in side elevation and partly in section, showing an auxiliary cushion installed at the forward end of the car.

Fig. 2 is a section on the line 2—2 of Fig. 1.

Fig. 3 is a section on the line 3—3 of Fig. 1

Fig. 4 illustrates on a small scale, and in side elevation, a typical front end installation.

Fig. 5 illustrates on a similar scale, and in side elevation, a typical rear end installation.

Fig. 6 is a perspective view of the strut link.

Fig. 7 is a perspective view of the arcuate thrust roller.

Fig. 8 is a fragmentary elevation showing the tie-rod connecting cushions at opposite sides of a car.

The installation of the auxiliary cushion at the front end of a front spring will first be described, reference being made to Figs. 1 to 4 and 6 to 8 inclusive.

The front spring horn formed on the side bar of the chassis is shown at 11 and terminates in a shackle bolt fitting 12 having a bolt hole as usual, to receive a shackle bolt and having an overhanging shroud or lip 13 to shed mud and water. The front end of the front spring 14 terminates in an eye 15, and in cars as turned out by the manufacturer the eye 15 is pivoted on the shackle bolt passing through the fitting 12. This bolt is removed to permit the installation of the auxiliary cushion and hence does not appear in the drawings, but its form and function are familiar to those skilled in the art.

As is also familiar to those skilled in the art the rear end of the spring 14 (not shown in the drawings) is customarily connected to the side bar of the chassis by a link pivoted to the side bar and to the spring 14 and intended to accommodate flexure of the spring. This link is not disturbed in installing the auxiliary cushion.

The auxiliary cushion chosen for illustration is of the pneumatic type and consists essentially of a cylinder 16 and a piston 17 confining a body of compressed air which urges the piston downward relatively to the cylinder.

The cylinder 16 is threaded at 18 into a base member 19 which straddles the fitting 12 and is connected thereto by a bolt 20. The bolt 20 passes through the bushings 21, 21 threaded in the base member and through the shackle bolt hole in the fitting 12 and is retained by nut 22 and lock washers 23. When the device is installed the bushings 21 are screwed in to center the base member 19 over fitting 12 and eliminate clearance. They are made long enough to offer outward projecting ends which are then cut off flush with the side faces of member 19, as shown in the drawings. The bolt 20 with its nut and washers then serves to lock all the parts rigidly together.

Embracing cylinder 16 by means of a split clamping band 24 is a brace having an arm 25 formed with a hole to receive a bolt 26. The end of arm 25 is rounded where it contacts with spring horn 11 to permit application regardless of the slope of horn 11. The cylinder 16 is swung to its proper upright position (the base 19 swinging on bolt 20 in such movement) and the band 24 is adjusted vertically on cylinder 16 to bring the end of arm 25 into contact with the top of spring horn 11. The band 24 is then clamped by setting up nut 27 on rod 28. The rod 28 is common to the two cylinder clamping bands 24 at opposite sides of the car and thus braces the two forward cushion structures. A hole to receive the bolt 26 is then drilled in each spring horn and this is ordinarily the only change necessary to be made in the original structure of the automobile in installing the devices.

The insertion of the bolt 26 serves to clamp the cylinder 16 in upright position and the adjustability of the band 24 on the cylinder 16 allows the desired adjustment to be made regardless of the slope of horn 11.

The base 19 is so formed as to hold the cylinder 16 in an outwardly offset position relatively to the bolt 20, as is clearly shown in Fig. 1, and space is thus offered for the passage through the base 19 and past the end of fitting 12 of a heavy strut link 29. This is hinged by a bolt 30 to piston 17 and by a bolt 31 to eye 15, and is channel shaped in cross-section. The sides of the link are guided by the faces 32 in base member 19, but the link is not otherwise guided by member 19 except that the face 33 limits outward swinging movement.

Such outward swinging movement rarely, if ever occurs, for the reason that the hinge bolt 30 and the hinge bolt 31 are so offset that the weight of the car produces a substantial turning moment tending to swing the link in the opposite direction, i. e., toward fitting 12. This tendency is supplemented by the drag of the front axle in forward movement of the car, and is resisted by an arcuate roller 34 pivoted on the bolt 20 within fitting 12. This roller is formed to clear lip 13 and bears against the channeled face of link 29. The link and the roller are formed with teeth 35 to preserve their relative positions, and these teeth since they are not designed to transmit power may be of the simple rounded form shown. This simplifies manufacture.

The roller 34 and face 33 ensure that link 29 is limited to right-line movement, and the pivoted link at the rear end of the spring 14 accommodates flexure of the spring. The lowering of the front end of front spring 14 makes it desirable to insert a wedge 36 to neutralize the angular displacement of the axle otherwise occasioned by the addition of the auxiliary cushion, and likely to affect the action in steering.

The mode of installing the auxiliary cushion at the rear of the car is shown in Fig. 5 and is similar in all respects except that when the arcuate roller 34 is omitted and the base member 19 is so dimensioned that link 29 and face 33 cannot collide in the functioning of the cushion and spring. In Fig. 5 the rear spring horn is shown at 40 and the rear spring at 41. Other parts are numbered as in the remaining figures, the parts except perhaps the base 19 (which may differ in dimensions) being identical with those already described. It is understood, of course that the forward end of spring 41 is pivoted to the side bar of the chassis, as is usual.

The construction above outlined makes it possible to install auxiliary cushions on practically any car having semi-elliptic springs by the use of chosen ones of four different sizes of base 19. Such bases are made in two widths to accommodate widely different widths of fitting 12, and each width is made with two different degrees of offset.

On cars having three-quarter elliptic suspensions, or semi-elliptic with cross equalizing springs, special adapters must be used in lieu of the base 19, but the other parts may be used without change.

What is claimed is:—

1. The combination with a leaf spring and a spring horn having a shackle bolt hole, of a base member straddling said horn; bushings threaded in said base member and engaging the sides of said spring horn to position the base member laterally thereon; a bolt passing through said bushings and the bolt hole in said spring horn; and an auxiliary cushion mounted on said base member and having a yielding element connected with said leaf spring.

2. The combination with a leaf spring and a spring horn having a shackle bolt hole, of a base member straddling said horn; bushings threaded in said base member and engaging the sides of said spring horn to position the base member laterally thereon; a bolt passing through said bushings and the bolt hole in said spring horn; an auxiliary cushion mounted on said base member and having a yielding element connected with said leaf spring; and an adjustable brace connected with said spring horn and serving to hold said base and cushion against turning on said shackle bolt.

3. The combination with a leaf spring and a spring horn having a shackle bolt hole, of a base member straddling said horn; a bolt passing through said base member and the bolt hole in said spring horn; an auxiliary cushion mounted on said base member and including an upright guide and a yielding plunger mounted therein and connected with said leaf spring; a brace adapted to be adjusted vertically on said upright guide, and having an arm projecting laterally; and means serving to connect said arm rigidly to said spring horn.

4. The combination with a leaf spring and a spring horn having a shackle bolt hole, of a base member straddling said horn; bushings threaded in said base member and engaging the sides of said spring horn to position the base member laterally thereon; a bolt passing through said bushings and the bolt hole in said spring horn; an auxiliary cushion mounted on said base member and including an upright guide and a yielding plunger mounted therein and connected with said leaf spring; a brace adapted to be adjusted vertically on said upright guide, and having an arm projecting laterally; and means serving to connect said arm rigidly to said spring horn.

5. The combination of a cushion; a base therefor releasably connected therewith, said base being adapted for bolting to the spring horn of an automobile; and a brace adjustable vertically on said cushion and adapted for connection to the spring horn of such automobile to prevent angular movement of said base and cushion.

6. In a vehicle the combination of a leaf spring; a spring horn; a cushion mounted on said spring horn and including a substantially vertically guided yielding plunger; a link pivotally connected to said plunger and leaf spring, said link being offset to create under the weight of the vehicle a turning moment on the link around its pivotal connection with the plunger; and a thrust roller engaging said link and sustaining it against said turning moment.

7. In a vehicle the combination of a leaf spring; a spring horn; a cushion mounted on said spring horn and including lateral confining guides near its bottom and a substantially vertically guided yielding plunger above; a link pivotally connected to said plunger and leaf spring to swing between said confining guides, said link being offset to create under the weight of the vehicle a turning moment on the link about its pivotal connection with the plunger; and a thrust roller engaging said link and sustaining it against said turning moment.

8. In a vehicle the combination of a leaf spring; a spring horn having a shackle bolt hole; a cushion structure mounted on said spring horn and including lateral confining guides near its bottom and a substantially vertically guided yielding plunger above; a bolt passing through said shackle bolt hole and partly sustaining said cushion structure; a link pivotally connected to said plunger and leaf spring to swing between said confining guides, said link being offset to create under the weight of the vehicle a turning moment on the link about its pivotal connection with the plunger; and a thrust roller mounted on said bolt within said base member engaging said link and sustaining it against said turning moment.

9. In a vehicle the combination of a leaf spring; a spring horn having a shackle bolt hole; a base member straddling said horn and having lateral confining guides; bushings threaded in said base member and engaging the sides of said spring horn to position the base member thereon; a bolt passing through said bushings and the bolt hole of said spring horn; an auxiliary cushion mounted on said base and including a vertical guide projecting upward from said base, and a yielding plunger mounted in said guide; a brace vertically adjustable on said guide and having a laterally projecting arm; means serving to connect said arm to said spring horn; a link pivotally connected to said plunger and to said leaf spring to swing between said confining guides, said link being offset to create under the weight of the vehicle a turning moment on the link about its pivotal connection with the plunger; and a thrust roller engaging said link and sustaining it against said turning moment.

10. In a vehicle the combination of a leaf spring; a spring horn having a shackle bolt hole; a base member straddling said horn and having lateral confining guides; bushings threaded in said base member and engaging the sides of said spring horn to position the base member thereon; a bolt passing through said bushings and the bolt hole of said spring horn; an auxiliary cushion mounted on said base and including a vertical guide projecting upward from said base, and a yielding plunger mounted in said guide; a brace vertically adjustable on said guide and having a laterally projecting arm; means serving to connect said arm to said spring horn; a link pivotally connected to said plunger and to said leaf spring to swing between said confining guides, said link being offset to create under the weight of the vehicle a turning moment on the link about its pivotal connection with the plunger; and a thrust roller mounted on said bolt within said base member engaging said link and sustaining it against said turning moment.

11. In a vehicle the combination of a leaf spring; a spring horn having a shackle bolt hole; a base member straddling said horn and having lateral confining guides; bushings threaded in said base member and engaging the sides of said spring horn to position the base member thereon; a bolt passing through said bushings and the bolt hole of said spring horn; an auxiliary cushion mounted on said base and including a vertical guide projecting upward from said base, and a yielding plunger mounted in said guide; a brace vertically adjustable on said guide and having a laterally projecting arm; means serving to connect said arm to said spring horn; a link pivotally connected to said plunger and to said leaf spring to swing between said confining guides, said link being offset to create under the weight of the vehicle a turning moment on the link about its pivotal connection with the plunger; and a thrust roller mounted on said bolt within said base member engaging said link and sustaining it against said turning moment, said link and roller being formed with interengaging teeth.

12. In a vehicle the combination of a leaf spring; a spring horn; a cushion mounted on said spring horn and including a substantially vertically guided yielding plunger; a link pivotally connected to said plunger and leaf spring, said link being offset to create under the weight of the vehicle a turning moment on the link around its pivotal connection with the plunger; and a thrust roller engaging said link and sustaining it against said turning moment, said link and roller being formed with interengaging teeth.

In testimony whereof I have signed my name to this specification.

BRADFORD B. HOLMES.